United States Patent

Robinson

[11] Patent Number: 6,155,769
[45] Date of Patent: *Dec. 5, 2000

[54] SYSTEM FOR TRANSPORTING PLURAL LOAD BEARING CARRIERS

[75] Inventor: John Rodger Robinson, Alberta, Canada

[73] Assignee: Green Drop Ltd., Calgary, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 09/047,557

[22] Filed: Mar. 25, 1998

[30] Foreign Application Priority Data

Mar. 27, 1997 [CA] Canada ................................... 2201246

[51] Int. Cl.⁷ ............................... B60P 1/64; B60P 1/02; B65G 65/23
[52] U.S. Cl. ........................... 414/498; 414/495; 248/143
[58] Field of Search .................................. 414/498, 495, 414/482, 483, 484, 485; 248/146, 143

[56] References Cited

U.S. PATENT DOCUMENTS

| | | | |
|---|---|---|---|
| 2,036,791 | 4/1936 | Bretschger | ............................... 248/143 |
| 3,255,906 | 6/1966 | Proler et al. | ........................ 414/498 X |
| 3,724,697 | 4/1973 | Arvidsson | ........................... 414/498 X |
| 4,053,072 | 10/1977 | Ross et al. | ........................... 414/498 X |
| 4,441,678 | 4/1984 | Dorpmund | ............................... 248/146 |
| 4,618,307 | 10/1986 | Kress et al. | ............................. 414/498 |
| 4,619,578 | 10/1986 | Routledge | ............................... 414/498 |
| 5,417,540 | 5/1995 | Cox | ..................................... 414/498 X |
| 5,484,248 | 1/1996 | Purcell | ............................... 414/498 X |
| 5,584,639 | 12/1996 | Walker | ............................... 414/482 X |
| 5,829,946 | 11/1998 | McNeilus et al. | .................. 414/498 X |
| 5,879,122 | 3/1999 | Voelzke | ............................... 414/498 X |

*Primary Examiner*—Robert P. Olszewski
*Assistant Examiner*—Gerald J. O'Connor
*Attorney, Agent, or Firm*—Murray E. Thrift; Adrian D. Battison

[57] ABSTRACT

A transportation system for liquid-carrying tanks. Each tank is mounted on a carrier unit and plural carrier units are transported by a single trailer or other vehicle. The trailer has an adjustable height, while each of the tank carrier units has adjustable height legs on its opposite sides. The units are loaded by backing the trailer under the carrier unit with the carrier unit legs extended and the trailer lowered. The trailer is then raised to lift the carrier unit to a transport position and the legs are in turn lifted to the transport position. For unloading, the reverse procedure is adopted, with the carrier unit legs being lowered to the ground and then the trailer being lowered and the trailer being pulled out from under the carrier unit. The carrier units are arranged with an angled base so that when the carrier is pulled out, the carrier unit will tilt forwardly to provide maximum drainage of the tank.

17 Claims, 6 Drawing Sheets

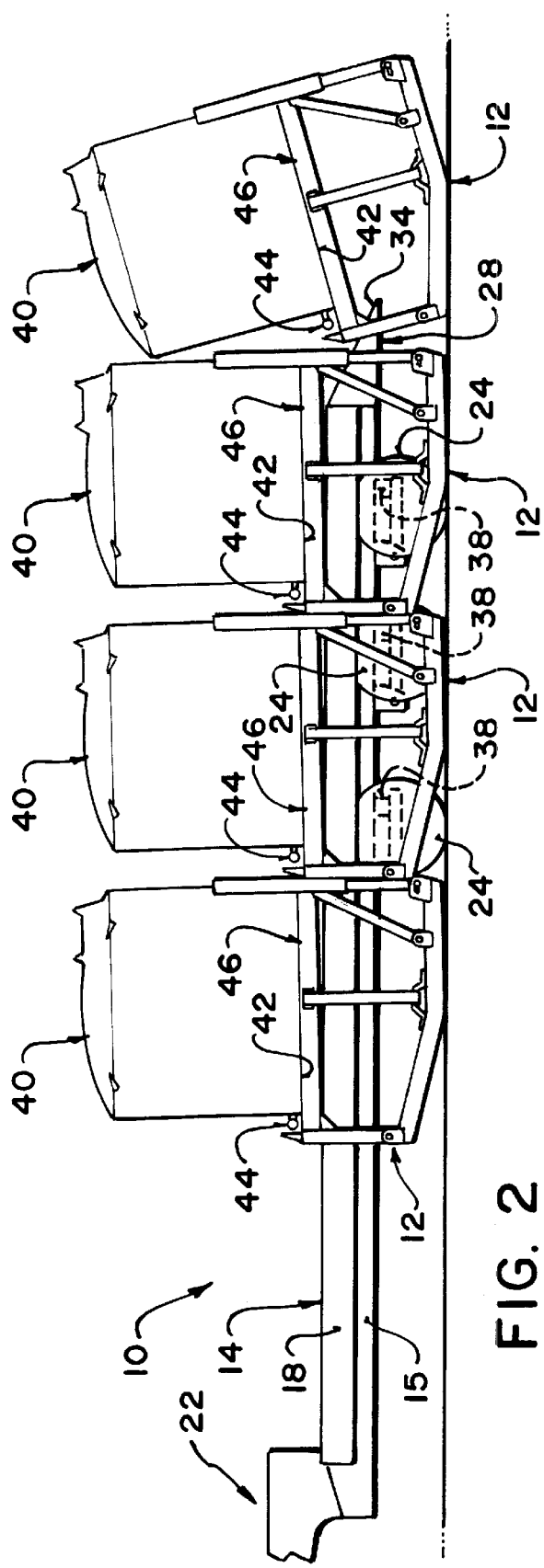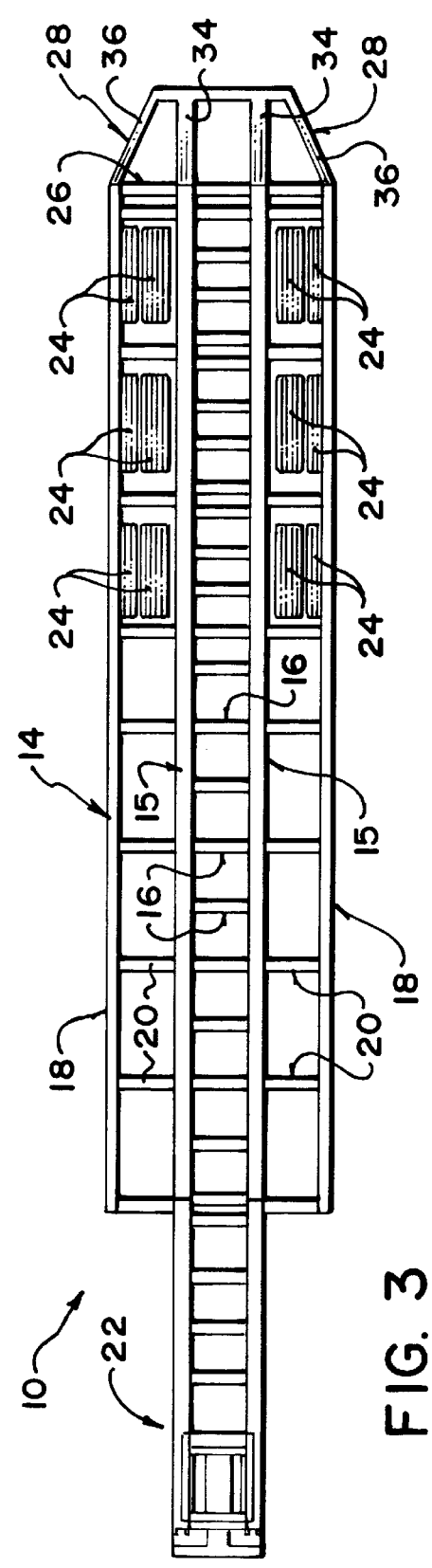

SYSTEM FOR TRANSPORTING PLURAL LOAD BEARING CARRIERS

FIELD OF THE INVENTION

The present invention relates to a transportation system and more particularly to a system useful for the transportation and delivery of bulk materials.

BACKGROUND

The present invention was developed in connection with the transportation and storage of liquids, and will be described particularly in connection with that application. It is to be understood, however that the invention has numerous other applications, for example, in the transportation of bulk solids and containers or large objects that would normally require auxiliary loading and unloading equipment.

In liquid transportation, the current practice is to load a liquid into a transport container at its point of origin. The transport container is then transported to its destination where the liquid is transferred into another receptacle. This multiple handling is time consuming and, in the case of liquids, risks a spill or contamination with every transfer. It would therefore be beneficial to be able to minimize the amount of handling necessary in transferring liquids or other materials from one location to another.

SUMMARY

According to one aspect of the present invention there is provided a transportation system comprising:

a carrier unit including:
  load bearing means for carrying a load; and
  support means depending from spaced apart positions on the load bearing means for supporting the load bearing means above a ground surface; and
a vehicle including:
  a vehicle bed engageable under the load bearing means, between the support means;
  ground wheels supporting the vehicle on the ground surface; and
  vehicle height adjustment means for adjusting the height of the vehicle bed on the ground wheels, between a raised position in which the bed supports the carrier unit with the support means spaced above the ground surface and a lowered position in which the bed is spaced below the load bearing means and the carrier unit is supported on the ground surface by the support means.

The system allows a vehicle to be placed under the carrier unit and lifted to raise the unit from the ground for transportation. At the destination, the vehicle is lowered to support the carrier unit on the ground, and then removed. This means that the product that is being transported would be loaded onto and unloaded from the vehicle without direct handling of the product and without the use of auxiliary equipment, for example, a forklift or a crane.

In preferred embodiments of the invention, the carrier unit is of adjustable height, with supports that can be raised (shortened) for transportation or lowered (lengthened) for loading or unloading.

It is also preferred that each support has fixed length front legs and adjustable length back legs. A base member extends between the front and back legs on each side and is pivotally connected to both. The base has front and back sections arranged at an obtuse angle so that when the back leg is extended and the carrier unit is set on the ground, a tank carried by the carrier unit will be inclined to the front. Liquid in the tank will thus drain towards the front of the tank, ensuring a more effective emptying of the tank than if it was resting with its bottom wall horizontal.

Thus, according to another aspect of the present invention there is provided a carrier unit for transporting and storing a liquid tank having a substantially flat bottom wall, said carrier unit comprising:

tank engaging means for engaging and supporting the tank;

support means for supporting the tank engaging means above the ground, and including a ground engaging base with a front ground engaging surface and a rear ground engaging surface oriented at an obtuse angle to one another, the base being mounted on the tank engaging means for movement between a transport position with the front ground engaging support generally parallel to the bottom wall of the tank and a field position with the front ground engaging surface diverging from the bottom wall of the tank towards the back such that the tank may be supported with its bottom wall sloping downwardly to the front.

BRIEF DESCRIPTION OF THE DRAWINGS

In the accompanying drawings, which illustrate an exemplary embodiment of the present invention;

FIG. 2 is a side view of the system during an unloading operation;

FIG. 3 is a top view of a trailer vehicle;

DETAILED DESCRIPTION

Figure 1:
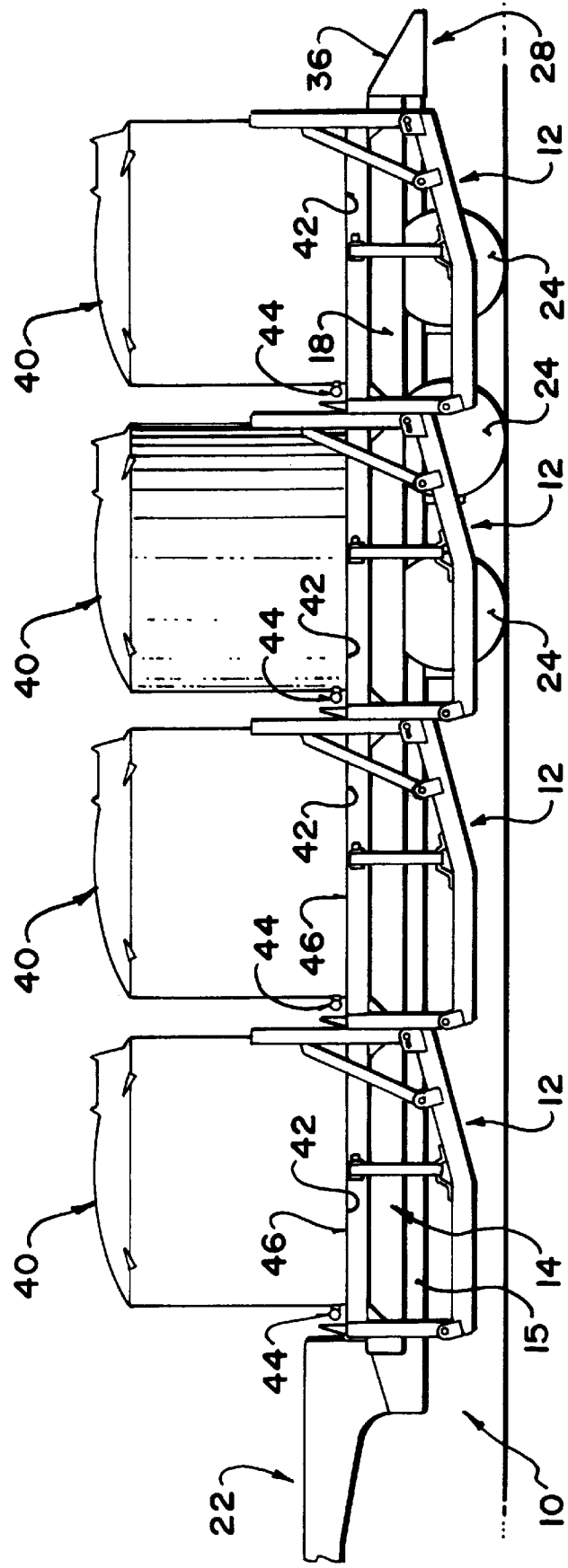
FIG. 1 is a side view of the system in the transport position.
Figure 4:
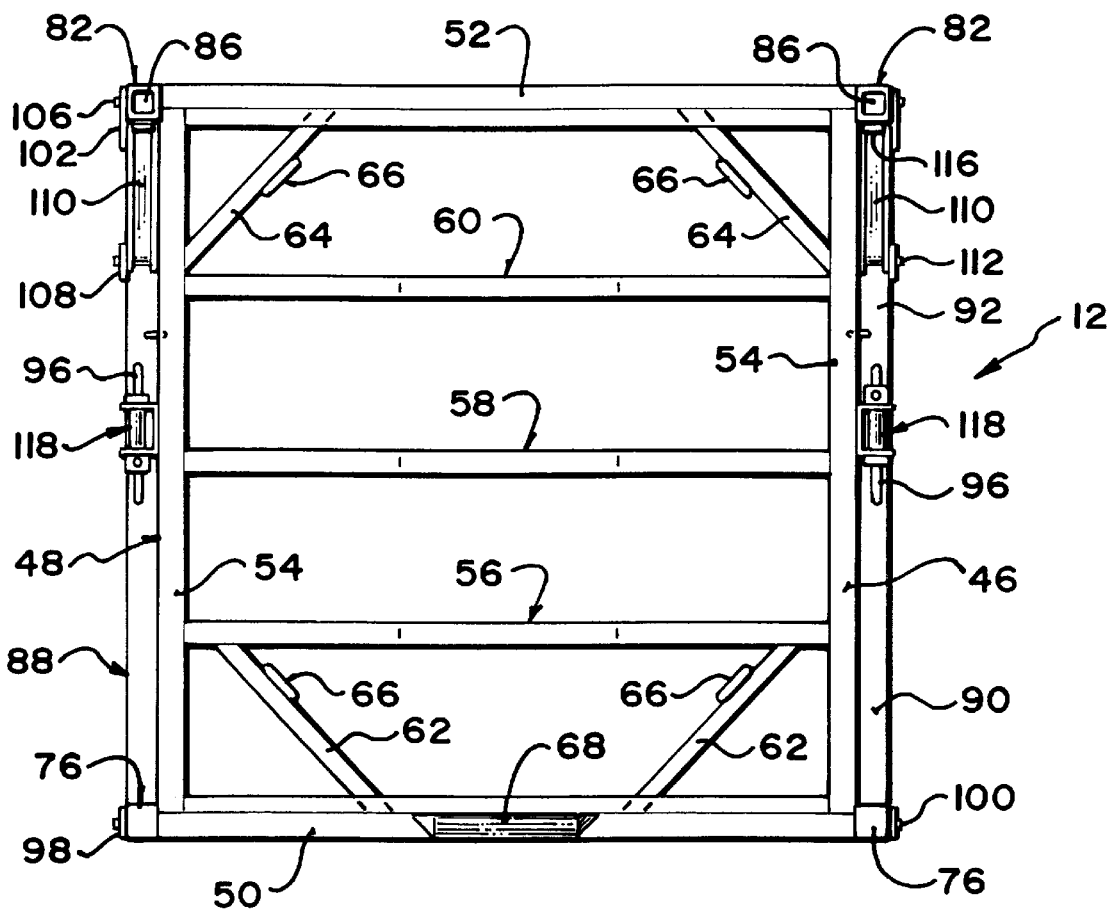
FIG. 4 is a top view of a carrier unit.
Figure 5:
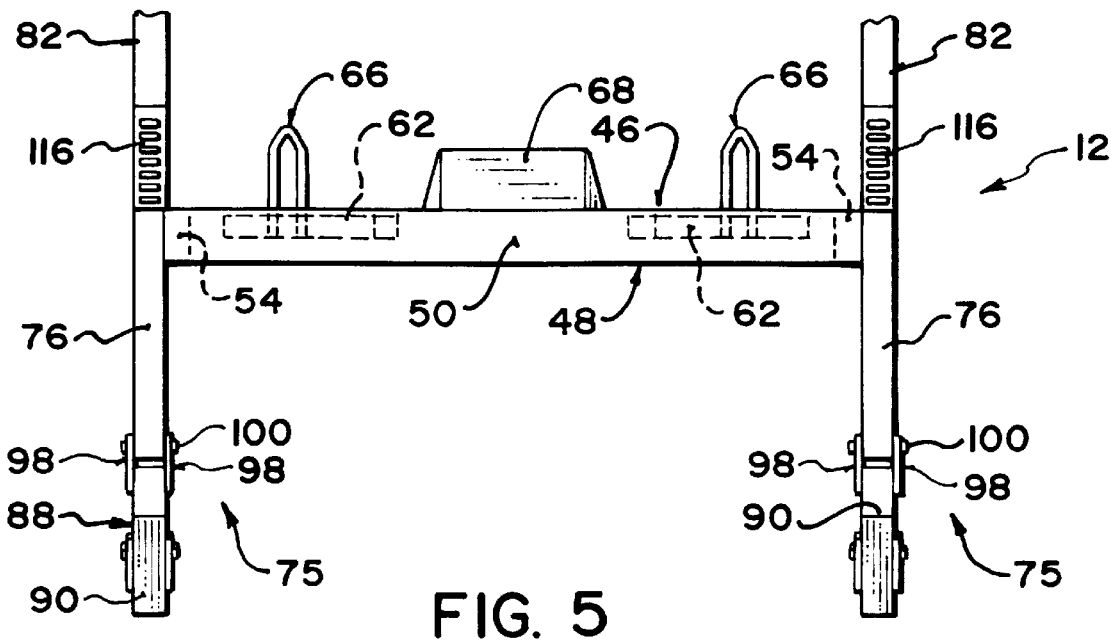
FIG. 5 is a front view of the carrier unit.
Figure 6:
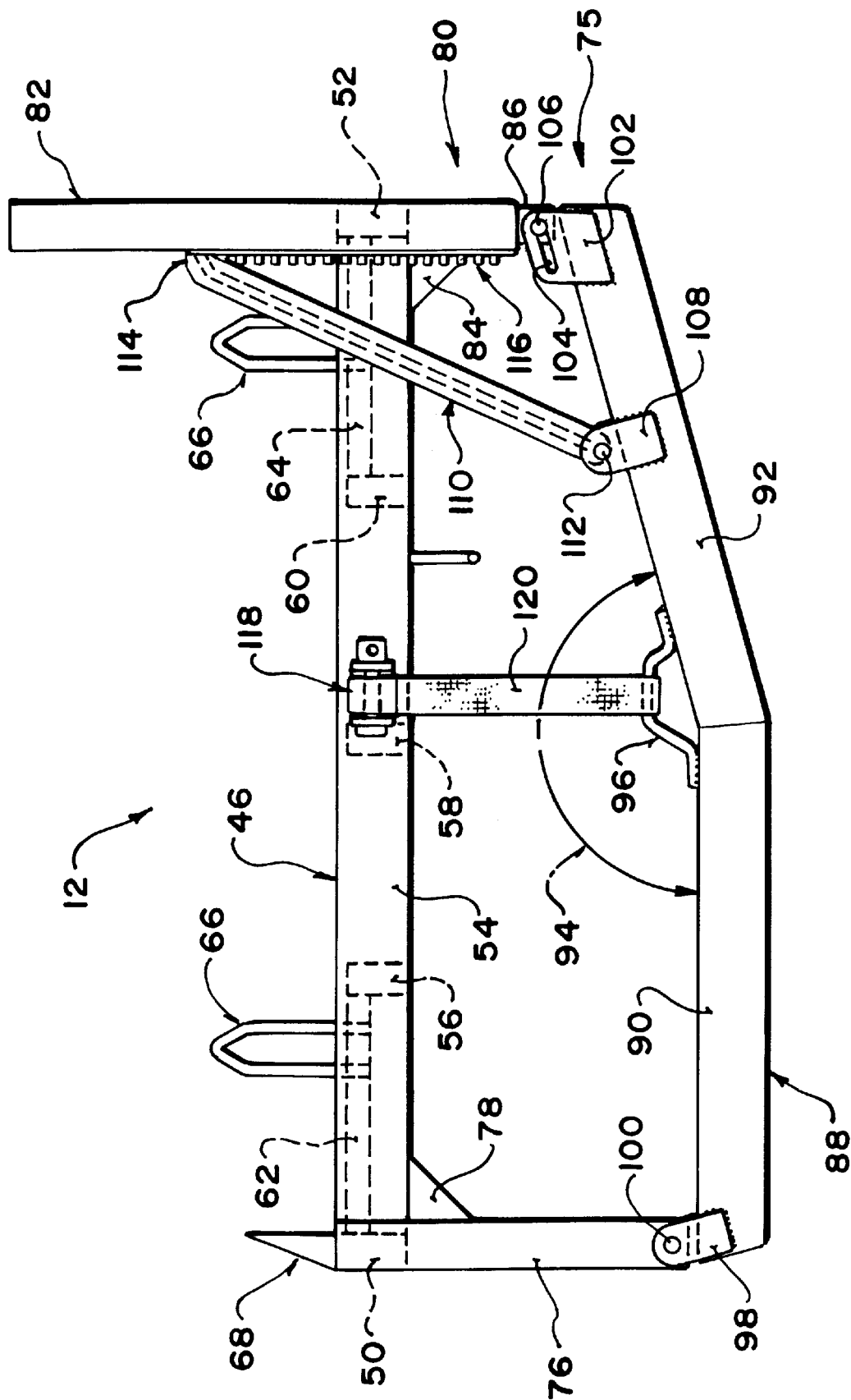
FIG. 6 is a side view of the carrier unit in the transport position.
Figure 7:
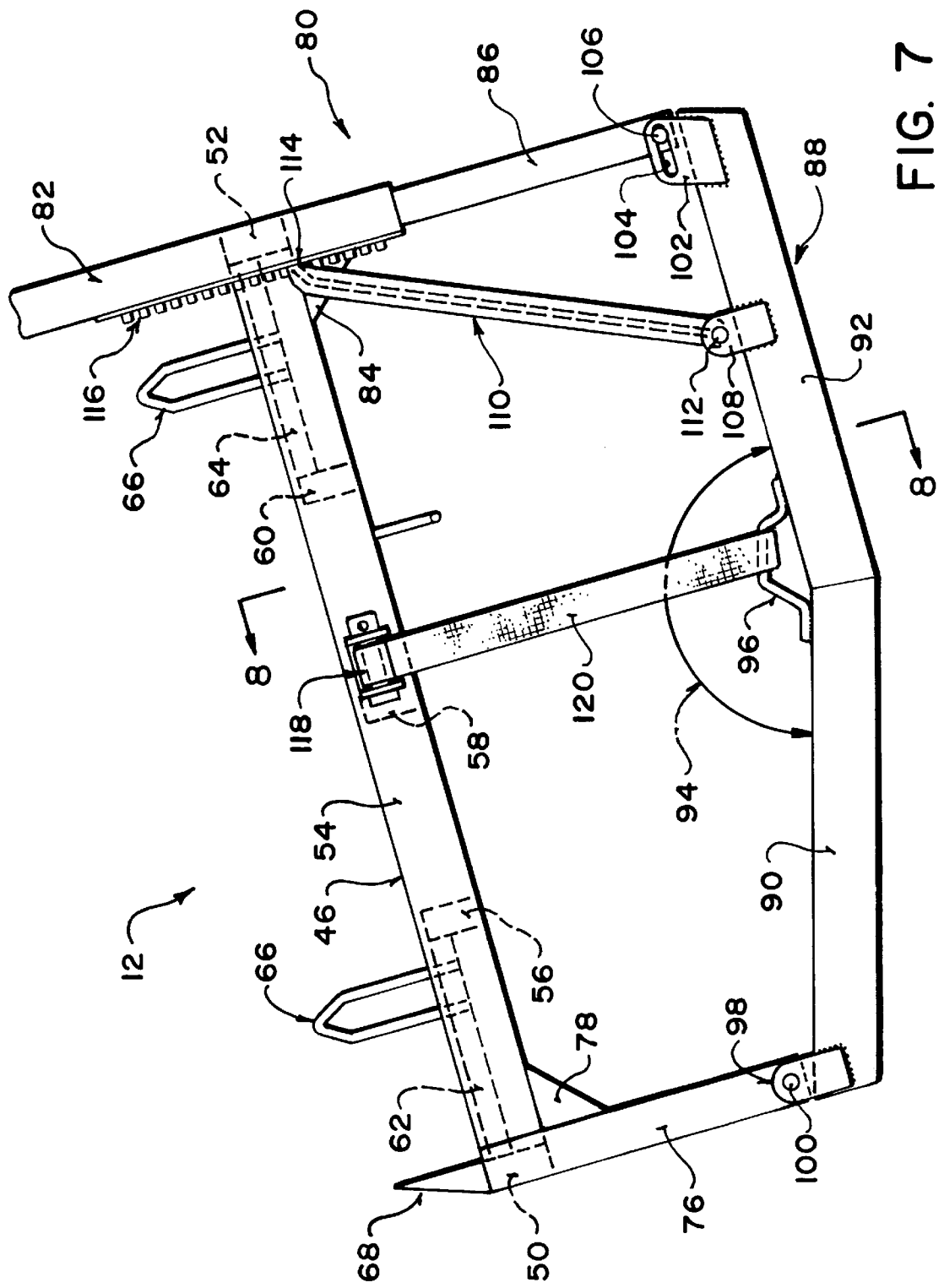
FIG. 7 is a side view of the carrier unit in the field position.

Referring to the accompanying drawings, FIGS. 1 and 2 illustrate a transportation system according to the invention in the transport and loading/unloading positions respectively. The system includes a trailer 10 and a set of four carrier units 12 that may be transported on the trailer. The trailer has a trailer bed 14 composed of two inner parallel rails 15 joined by cross-members 16 and two outer rails 18 connected to the rails 15 by cross members 20. At the front of the trailer is a gooseneck 22 for connection to a fifth wheel hitch. The trailer is supported on a set of ground wheels 24 by an air suspension. In the illustrated embodiment there are three axles with four wheels each.

At the rear of the trailer is a cross member 26 behind which the outer rails converge as two guides 28. The top faces 34 of the rails 15, and the top faces 36 of the guides slope downwardly to the rear as a ramp.

The suspension supporting the trailer bed 14 on the wheels includes a set of air bags 38 acting as spring-dampers. The pressure in the air bags can be controlled to inflate or deflate the air bags, thus raising or lowering the trailer bed 14 on the wheels.

Each of the carrier units 12 carries a liquid container 40 with a flat bottom 42 and a drain cock 44 at one side. Each container is supported on a load bearing platform 46 of the carrier unit. The configuration of the carrier unit is particularly illustrated in FIGS. 4 through 7. The carrier unit platform 46 includes a square frame 48 with a front member 50, a back member 52 and two side members 54. The side members are joined by three cross-members 56, 58 and 60. Two front corner braces 62 extend between the front member 50 and the front cross-member 56 while two corner braces 64 join the back frame member 52 to the side members 54 immediately behind the back cross member 60. Each of the corner braces carries an upstanding tie-down loop 66. A front stop plate 68 projects upwardly from the front of the front member 50, at the center, immediately in front of the stop cock 44.

On each side of the platform 46 is a support assembly 75. This includes a fixed front leg 76 secured to and depending from the front corner of the platform. A gusset plate 78 braces the front leg against the adjacent side member 54. Each of the support assemblies also includes an adjustable length rear leg assembly 80. This includes an outer square tube 82 fixed to the platform 46 at the outside of the rear corner and a gusset plate 84 bracing the outer tube against the adjacent side member 54. An inner square tube 86 slides telescopically in the outer tube 82.

The support assembly also includes a base member 88 that extends between the front and back legs. The base member has a front section 90 and a back section 92 that intersect mid-way between the legs at an obtuse angle 94. A staple 96 is mounted on the top of the base member at the center. Two lugs 98 mounted at the front end of the base member are positioned on opposite sides of the front leg and are pinned to the front leg by a lateral pivot pin 100. At the back end of the base member are two lugs 102 that are positioned on opposite sides of the bottom of the inner tube 86 of the back leg. Slots 104 in the lugs accommodate a cross-pin 106 coupled to the inner tube. The slots accommodate pivotal movement of the brace on the rear leg and also relative horizontal displacement in the front to back direction as the base member pivots about the front pivot pin 100. Two lugs 108 are mounted on opposite sides of the base member 88 at a position spaced from the back leg. These are pinned to a brace 110 by a cross pin 112. The brace extends upwardly and to the back. It has a pawl 114 at its upper end to engage a rack 116 extending along the front face of the fixed, outer tube 82 of the rear leg 80.

Figure 8:
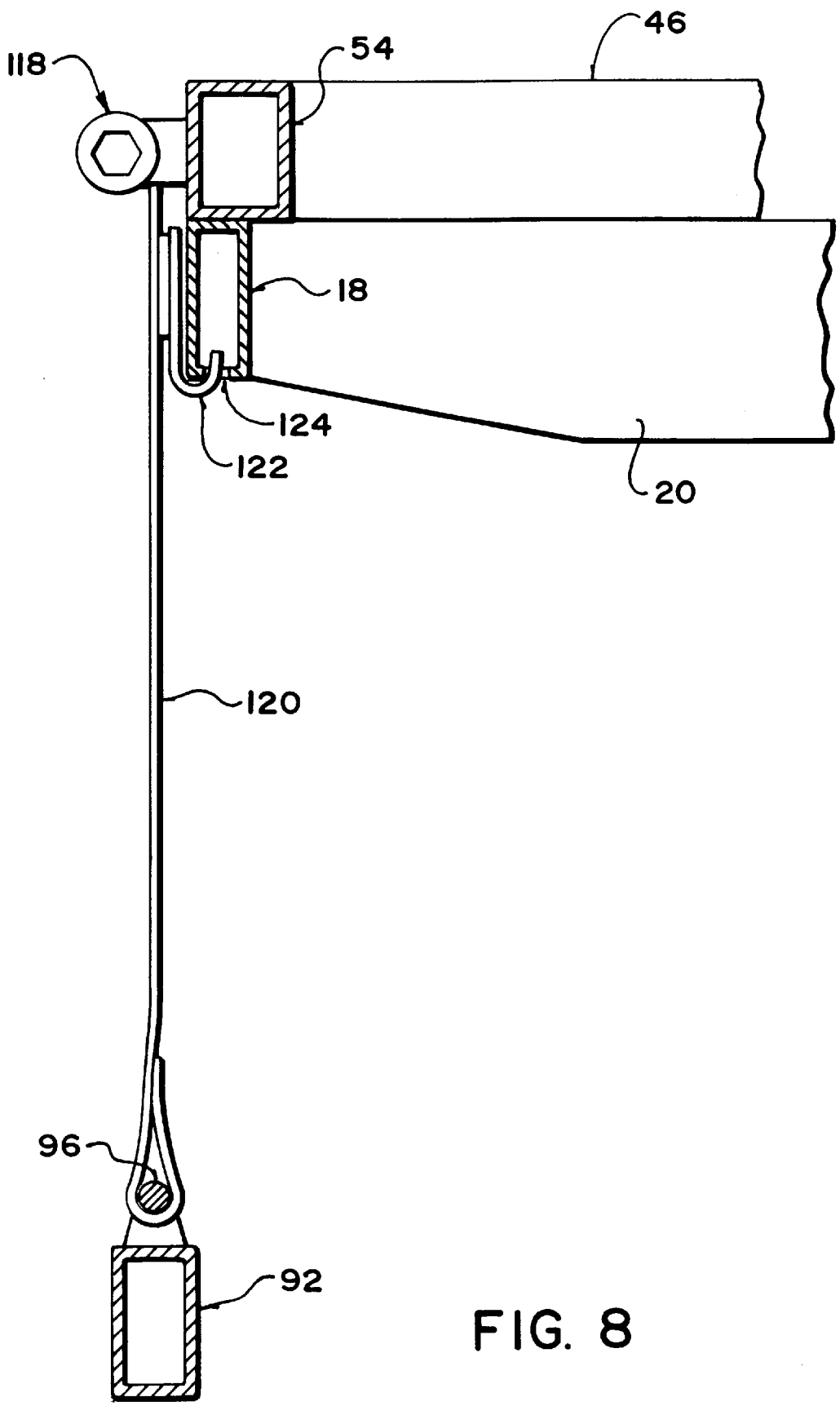
FIG. 8 is a sectional view along line 8—8 of FIG. 7.

Opposite sides 54 of the platform frame carry winches 118 on which straps 120 are wound. Each strap is connected at its end to the staple 96 on the adjacent leg base 88. Partway along its length, the strap carries a J-hook 122 on the inner side, as shown in FIG. 8. Winding in the strap 120 with the winch 118 raises the leg base to the transport position where the J-hook 122 engages a slot 124 in the bottom of the outer rail 18, so that the strap acts both to raise the leg base and to hold down the carrier on the trailer.

The trailer can be loaded with four of the carrier units. The unloading procedure for the trailer is as follows:

With the trailer in the raised position illustrated in FIG. 1, the support assemblies 75 are lowered by releasing the pawls of the rear braces 110 from the racks 114. The pawls are engaged with the racks in the lowered position of the back legs to lock the legs in position. The trailer bed is then lowered by deflating the air bag suspension. The trailer bed height may be adjusted to between 40 inches and 50 inches above ground level, with an approximate transportation height of 44½ inches.

As the trailer bed lowers, the weight at the back of each frame is transferred from the trailer rails to the back legs.

The lowered trailer is moved forward. As it does so, the carrier unit and the attached liquid tank slide on the trailer rails until the front of the carrier unit reaches the sloped guides 28. When the carrier reaches the sloped upper surfaces at the back of the rails, the front of the trailer slides down the ramps, allowing the carrier unit and the liquid container to tilt to a stable position resting on the ground as illustrated by the final container in FIG. 2. With the container in this position, the bottom of the container is tilted down to the front for relatively complete drainage of the tank.

For loading purposes, the trailer is lowered on its suspension and backed under the carrier unit to lift the front of the carrier unit. The rails on the trailer engage under the carrier, with the convergent sides of the guides 28 serving as an alignment system to center the carrier unit on the trailer. The outer rails engage the inner sides of the support assemblies 75 to hold the carriers in place. When the carrier unit is on the trailer, the trailer is raised on its suspension to lift the legs of the carrier unit off the ground. The legs then are raised using the straps 120 after releasing the brace 110. The trailer is then lowered from its fully raised position to its transport position.

The tanks are supported in place using tie downs and the tie down lugs 66.

While one embodiment of the present invention has been described in the foregoing, it is to be understood that other embodiments are possible within the scope of the invention. Thus, for example, the raising and lowering of the trailer is described in the foregoing as accomplished with an air suspension, but in other embodiments this can be achieved hydraulically or mechanically. Thus, due to the fact that many variations and modifications of the present invention may be made by those knowledgeable in the present art, the invention is to be construed as limited solely by the scope of the appended claims.

What is claimed is:

1. A transportation system comprising:
   a plurality of carrier units, each carrier unit including:
      a load bearing structure for carrying a load; and
      two supports depending from spaced apart positions on the load bearing structure each support having adjustable components for adjusting the height of the support between a field position of the carrier unit, with the support at a lowered field height with respect to the load bearing structure for supporting the load bearing structure above a ground surface and a transport position of the carrier unit, with the support at a raised transport height with respect to the load bearing structure; and
   a vehicle having longitudinally spaced front and rear ends, the vehicle including:
      a single longitudinally extending vehicle bed extending between the front and rear ends of the vehicle, the single vehicle bed being engageable simultaneously under the load bearing structures and between the supports of the plurality of carriers arranged in a longitudinal row;
      ground wheels supporting the vehicle on the ground surface; and
      a vehicle height adjustment system for adjusting the height of the single vehicle bed on the ground wheels, between a raised position of the vehicle in which the single bed supports the load bearing structures of the carrier units at a height above the field height whereby the supports are spaced above the ground surface, and a lowered position of the vehicle in which the bed is spaced between the field and transport heights of the supports.

2. A system according to claim 1 including interengaging alignment members mounted on the carrier unit and the vehicle for aligning the carrier with the vehicle in response to the vehicle moving into a position between the supports and under the load bearing structure.

3. A system according to claim 2 wherein the alignment members comprise alignment rails on the carrier that are engageable with the vehicle bed.

4. A system according to claim 2 wherein the vehicle bed comprises spaced apart rails and the alignment members include tapered guides on the rails.

5. A system according to claim 1 wherein the load bearing structure of the carrier unit comprises a load bearing platform and the supports comprise two fixed height front legs secured rigidly to the platform on opposite sides thereof and two adjustable height back legs secured to the platform on the opposite sides thereof.

6. A system according to claim 5 wherein the supports further comprise two elongate base members, each coupled to bottom ends of the front and rear legs on a respective side of the platform.

7. A system according to claim 5 wherein each back leg comprises a fixed component fixed to the load bearing structure, an adjustable component carried by and movable with respect to the fixed component and a latch selectively engageable for latching the movable component in selected positions with respect to the fixed component.

8. A system according to claim 1 including a ramp at a back end of the vehicle for lifting or lowering engagement under the carrier unit as the vehicle moves respectively under or out from under the carrier unit.

9. A system according to claim 1 wherein the carrier unit includes a liquid carrying tank mounted on the load bearing structure.

10. A system according to claim 1 wherein the vehicle is a trailer.

11. A system according to claim 1 wherein the vehicle height adjustment system comprises a vehicle suspension.

12. A transportation system according to claim 1 wherein the carrier unit is for transporting and storing a liquid tank having a substantially flat bottom wall, and wherein:
the load bearing structure comprises a tank engaging platform for engaging the flat bottom of the tank and supporting the tank;
the supports include a ground engaging base with a front ground engaging surface and a rear ground engaging surface oriented at an obtuse angle to one another, the base being mounted on the tank engaging platform for movement between a transport position with the front ground engaging support generally parallel to the bottom wall of the tank and a field position with the front ground engaging surface diverging from the bottom wall of the tank towards the back such that the tank may be supported with its bottom wall sloping downwardly to the front.

13. A transportation system according to claim 12 wherein the supports comprise two support assemblies on opposite sides of the tank engaging platform, each support assembly comprising a fixed height front leg, an adjustable height back leg and a base member extending between and coupled to the front and back legs.

14. A transportation system according to claim 13 wherein each base member comprises a portion of said front ground engaging surface and a portion of said rear ground engaging surface.

15. A transportation system according to claim 13 wherein the support assemblies are spaced apart.

16. A transportation system comprising:
a carrier unit including:
a load bearing structure including a load bearing platform for carrying a load; and
supports depending from spaced apart positions on the load bearing structure for supporting the load bearing structure above a ground surface, the supports comprising two fixed height front legs secured rigidly to the platform on opposite sides thereof, two adjustable height back leas secured to the platform on the opposite sides thereof and two elongate base members, each coupled to bottom ends of the front and rear legs on a respective side of the platform, each base member having a front section pivotally connected to the respective front leg and a back section pivotally and slidably connected to the respective back leg, the front and back sections intersecting at an obtuse angle; and
a vehicle including:
a vehicle bed engageable under the load bearing structure, between the supports;
ground wheels supporting the vehicle on the around surface; and
a vehicle height adjustment system for adjusting the height of the vehicle bed on the ground wheels, between a raised position in which the bed supports the carrier unit with the supports spaced above the ground surface and a lowered position in which the bed is spaced below the load bearing structure and the carrier unit is supported on the ground surface by the supports.

17. A transportation system comprising:
a carrier unit including:
a load bearing structure including a load bearing platform for carrying a load; and
supports depending from spaced apart positions on the load bearing structure for supporting the load bearing structure above a ground surface, the supports including two fixed height front legs secured rigidly to the platform on opposite sides thereof and two adjustable height back legs secured to the platform on the opposite sides thereof, each back leg comprising a fixed component fixed to the load bearing structure, an adjustable component carried by and movable with respect to the fixed component and a latch selectively engageable for latching the movable component in selected positions with respect to the fixed component, the latch comprising a ratchet fixed to and extending along the fixed component, a brace pivotally mounted on the carrier unit and a ratchet engaging pawl mounted on the brace for engaging the ratchet at selected positions therealong; and
a vehicle including:
a vehicle bed engageable under the load bearing structure, between the supports;
ground wheels supporting the vehicle on the ground surface; and
a vehicle height adjustment system for adjusting the height of the vehicle bed on the ground wheels, between a raised position in which the bed supports the carrier unit with the supports spaced above the ground surface and a lowered position in which the bed is spaced below the load bearing structure and the carrier unit is supported on the ground surface by the supports.

* * * * *